Patented Mar. 22, 1949

2,465,221

UNITED STATES PATENT OFFICE 2,465,221

A METHOD OF PRODUCING A MINERAL OIL CONCENTRATE

George R. Gilbert, Elizabeth, N. J., assignor to Standard Oil Development Company, a corporation of Delaware No Drawing. Application December 30, 1944, Serial No. 570,743

7 Claims. (Cl. 252—33)

This invention relates to a method of producing concentrated oil solutions of oil-soluble petroleum sulfonate salts or inorganic complexes or coordination compounds of the same. When petroleum fractions of the lubricating oil range are subjected to the action of a sulfonating agent such as concentrated sulfuric acid, sulfur trioxide, sulfonyl chloride, and the like, a portion of the oil is converted to sulfonic acids. The so-called mahogany acids, usually of greater than 300-350 molecular weight, are oil-soluble and remain in the oil, whereas lower molecular weight sulfonic acids and di-sulfonated acids settle out as a sludge. This invention deals with the salts and complexes of the mahogany sulfonic acids.

Oil-soluble sulfonates are particularly useful in the manufacture of rust preventives, emulsifiable oils, engine oil detergent additives, and for many other purposes. Alkali metal or ammonium sulfonates are most frequently used where some degree of water emulsifiability is desired, whereas polyvalent metal sulfonates and organic base sulfonates find use in dispersing materials in oils and as engine oil detergents. In co-pending application Serial No. 564,546, filed November 21, 1944, by Zimmer, Carlson, and Duncan, and assigned to applicant's assignee, it is shown that polyvalent metal sulfonates suitable for use as engine oil detergents may be improved as regards detergency and oil-solubility by reacting them with metal bases or with certain salts to form a metal sulfonate-inorganic salt complex or coordination compound. For instance, calcium sulfonate oil solutions may be contacted with an aqueous solution of not more than one mol of calcium chloride, calcium hydroxide, ammonium chloride, ammonium nitrate, or lithium hydroxide, or the like, per mol of sulfonate, and the water removed by evaporation to give an oil solution of a calcium sulfonate coordination compound or complex of much greater fluidity than the original calcium sulfonate concentrate.

By the method commonly employed for the production of oil-soluble alkali metal sulfonates from petroleum oils, a selected lubricating oil stock is treated with concentrated sulfuric acid or other sulfonating agent to form sulfonic acids, often as a by-product of white oil manufacture. The acid oil containing the mahogany sulfonic acids, after separation from the sludge and blowing with inert gas to remove sulfur dioxide, is neutralized with a slight excess of sodium carbonate to convert the sulfonic acids to sodium petroleum sulfonates. The sodium sulfonates are then extracted with approximately 50% aqueous alcohol, the solvent distilled off, and the product taken up in more concentrated alcohol (at least 80%) and stored to settle out inorganic salts. The solution is then distilled in the presence of added oil to yield a final product comprising 30%–70% sodium sulfonate in oil.

In the aqueous alcohol extraction method for recovering sulfonates, a settling period of from one to seven days, generally two to five days, has been found necessary to separate inorganic salts. This necessitates a tie-up of settling space, thereby reducing the capacity of a given plant. In addition, if polyvalent metal sulfonates or organic base sulfonates are desired, because of the poor solubility of these sulfonates in aqueous alcohol, the sodium sulfonates must first be produced. These are then converted to the desired sulfonate salt by a double decomposition reaction, the additional step thereby greatly increasing the cost of the sulfonate salt.

It is an object of this invention to provide a method of preparing petroleum sulfonate salts and their complexes and concentrated solutions of the same in a more direct manner, which avoids the necessity of forming alcohol extracts. It is a further object of the invention to provide a method for the production of alkaline earth metal salts and other polyvalent metal salts by direct neutralization of the sulfonic acid with the desired base, without the necessity of first forming an alkali metal salt.

In accordance with the present invention, a solution of the desired sulfonate salt is first produced by neutralization of the sulfonic acids remaining in the oil phase following sulfonation of a lubricating oil fraction. This produces a solution of about 1% to 30% of sulfonate salt in the oil, depending upon the oil and the degree of treatment, together with certain amounts of inorganic salts resulting from the neutralization of residual sulfuric and sulfurous acids and from the presence of excess neutralizing agent. In order to concentrate the sulfonate salts to a point where their use may be economically feasible for many purposes (30%–70% sulfonate) the oil solution is contacted with a selective solvent, of the type commonly employed for separating the more aromatic constituents of a lubricating oil from the more paraffinic constituents, in a manner such that two phases are formed. Suitable solvents for this purpose are phenol, aqueous phenol, nitrobenzene, cresol (with or without an auxiliary solvent such as a low boiling hydrocarbon), and furfural. The sulfonate salts will be found to have become concentrated in the solvent or extract phase where, following desolventization, their concentration in oil will be of the order of 30% to 70% or even higher.

The solvent-free raffinate oil will be found to be of excellent lubricating oil quality, having been subjected to both acid and solvent refining, and for certain uses, such as medicinal oils, the oil may be further refined by conventional methods.

Thus, the process of this invention has resulted in obtaining on the one hand an oil solution of sulfonate salts of the desired concentration, and, on the other hand, a refined lubricating oil of good quality. In addition, the disadvantages attendant upon the alcohol extraction process are avoided and the necessity for the intermediate formation of sodium sulfonates in the manufacture of polyvalent metal or organic base sulfonates is eliminated.

In practicing the present invention, a petroleum oil which may be from asphaltic, mixed, or paraffinic base crudes and may or may not have been partially refined, is treated with a sulfonating agent such as concentrated sulfuric acid, e. g., an acid of strength ranging from 85% to fuming, at a temperature ranging from atmospheric to 170° F. The amount of acid employed and the method of treating may be any that may be desired, but in general it is preferred to apply about 100 lbs. to 400 lbs. of acid per barrel of oil in from two to ten successive treatments. The resulting oil solution is separated from the sludge which has been formed and is blown with an inert gas to remove sulfur dioxide. The oil solution of sulfonic acid is then treated with a substance which converts the sulfonic acids into sulfonate salts. This substance may be a metal, an oxide or hydroxide of a metal, or a salt of a volatile acid and a metal, or it may be an organic base such as an oil-soluble aliphatic amine. In some cases the neutralization reaction proceeds at a more rapid rate if an ionizing medium such as water is added along with the basic substance, but this is not in all cases necessary. Dry calcium carbonate, for example, is quite satisfactory. The method may be employed for the production of any metallic or organic base sulfonate, but those most commonly desired and which may be most conveniently produced by the present method are the sulfonates of sodium, calcium, magnesium, barium, tin, lithium, zinc, aluminum, and lead.

In carrying out the neutralization step, the metallic base or other neutralizing substance is added usually in an amount to produce a slight excess, the unused portion of such material being filtered off. It is, however, quite feasible to prepare a basic sulfonate salt by adding a substantial excess of basic material, or a sulfonate salt coordination compound or complex can be formed as previously described. The temperature of the neutralization reaction may be any temperature below 170° F., the temperature at which the sulfonic acids tend to decompose.

After the acid has been neutralized and the coordination compounds, if any, formed, the oil solution is filtered and then treated with a solvent which is suitable for the concentration of the aromatic constituents of lubricating oils. For the concentration of calcium sulfonates, phenol and aqueous phenol are particularly satisfactory, although all of the aforementioned solvents may be used. The ratio of the solvent to the oil solution of sulfonates is preferably within the range of 0.2 to 5 by volume. The temperature of solvent treatment may be within the range of 70 to 300° F., preferably from 150 to 220° F. The method of treatment may be any of the usual methods for contacting oil and solvent in solvent treating processes, such as batch treatment or countercurrent processes.

One method of applying the method of the present invention to the production of a concentrated solution of calcium petroleum sulfonate is illustrated in detail by the following description of an example of such production, which is given by way of illustration only and is not intended to limit the scope of the invention in any way.

*Example 1*

Three separate portions of a distillate from a coastal naphthenic crude oil having a viscosity of 529.5 seconds Saybolt at 100° F. and 55.1 seconds Saybolt at 210° F. and a viscosity index of 26.9 were submitted to batch treatment at 150–160° F. with 98% sulfuric acid. Batch A was treated with an equivalent of 75 lbs. acid per bbl. of oil. Batch B was given two such treatments, and batch C was given two treatments of 100 lbs. per bbl. After the sludge had settled, the oil was decanted and neutralized by treatment with a slight excess of calcium hydroxide and a small amount of water. After dehydrating and filtering out the excess of lime, each batch was treated with an equal volume of phenol containing 10% water at a temperature of 150–160° F., and in the case of batch B a second treatment with 50% its volume of 90% phenol was given to the raffinate from the first treatment. After settling and separation of the raffinate and extract phases, the latter was in each case drawn off and the extracts from the two treatments of batch B were combined. The solvent was removed from the raffinate and extract by distillation and nitrogen stripping at 400° F. The data on the three runs are given in the following table.

|  | Batch A | Batch B | Batch C |
|---|---|---|---|
| Acid Treatment: | | | |
| Number of treatments | 1 | 2 | 2 |
| Amount of acid per treatment (g./liter of oil) | 179.9 | 179.9 | 239 |
| Acid oil yield, wt. percent | 90 | 79 | 75 |
| Soap in neutralized oil,[1] wt. percent | 2.6 | 5.5 | 11 |
| Phenol Extraction: | | | |
| Amount of solvent, vol. percent | 100 | 100+50 | 100 |
| Raffinate yield, wt. percent on neut. oil | 83 | 83 | 83 |
| Tests on Raffinate: | | | |
| Vis./100° F., seconds | 425.5 | 363.6 | 315.1 |
| Vis./210° F., seconds | 53.3 | 51.8 | 50.5 |
| Viscosity Index | 49 | 60.5 | 71 |
| Yields: | | | |
| Overall raffinate, wt. percent on charge | 75 | 65 | 62 |
| Overall extract, wt. percent on charge | 2.3 | 12.6 | 13.6 |
| Concentration of calcium sulfonate in extract, wt. percent | 39 | 31 | 67 |
| Equivalent yield of 30% concentrate, wt. percent on charge | 3 | 13 | 30.4 |

[1] Determined by batch countercurrent extraction of a sodium carbonate neutralized portion of the oil with aqueous alcohol and petroleum ether.

I do not intend that the scope of the present invention be limited by any of the examples or special conditions recited above, but solely by the terms of the appended claims.

I claim:

1. A method of producing a mineral oil concentrate of at least one compound of the class consisting of polyvalent metal petroleum sulfonates and polyvalent metal petroleum sulfonate-inorganic complexes, said complexes being prepared by reacting a solution of a polyvalent metal petroleum sulfonate with an aqueous solution of not more than one mol of a material selected from the class consisting of calcium chloride, calcium hydroxide, ammonium chloride, ammonium nitrate, and lithium hydroxide, and evaporating the water therefrom, which comprises treating a mineral oil solution of at least one of said sulfonate-containing compounds with a solvent of the type which has preferential solvent action on the aromatic components of a hydrocarbon mineral oil, whereby an extract phase and a raffinate phase are formed, separating the phases and removing the solvent from the extract phase, thereby yielding a mineral oil concentrate of the compound.

2. A method of producing a mineral oil concentrate of a polyvalent metal petroleum sulfonate, which comprises treating a mineral oil solution of a polyvalent metal petroleum sulfonate with a solvent of the type which has preferential solvent action on the aromatic components of a hydrocarbon mineral oil, whereby an extract phase and a raffinate phase are formed, separating the phases and removing the solvent from the extract phase, thereby yielding a mineral oil concentrate of a polyvalent metal petroleum sulfonate.

3. A method according to claim 2 in which the polyvalent metal petroleum sulfonate is calcium petroleum sulfonate and in which the preferential solvent is phenol.

4. A method according to claim 3 in which the solvent is aqueous phenol of approximately 90% strength.

5. A method of producing a mineral oil concentrate of at least one polyvalent metal petroleum sulfonate-inorganic complex, said complex being prepared by reacting a solution of a polyvalent metal petroleum sulfonate with an aqueous solution of not more than one mol of a material selected from the class consisting of inorganic metal salts, hydroxides and oxides, and evaporating the water therefrom, which comprises treating a mineral oil solution of at least one of said complexes with a solvent of the type which has preferential solvent action on the aromatic components of a hydrocarbon mineral oil, whereby an extract phase and a raffinate phase are formed, separating the phases and removing the solvent from the extract phase, thereby yielding a mineral oil concentrate of at least one polyvalent metal petroleum sulfonate-inorganic complex.

6. A method according to claim 5 in which the solvent is phenol.

7. A method according to claim 6 in which the solvent is aqueous phenol of approximately 90% strength.

GEORGE R. GILBERT.

REFERENCES CITED

The following references are of record in the file of this patent:

UNITED STATES PATENTS

| Number | Name | Date |
| --- | --- | --- |
| 2,050,345 | Liberthson | Aug. 11, 1936 |
| 2,218,174 | Lazar et al. | Oct. 15, 1940 |